United States Patent
Ingraham

(10) Patent No.: US 7,210,572 B2
(45) Date of Patent: May 1, 2007

(54) ADJUSTABLE GUIDE FOR A BOTTLE HANDLING SYSTEM

(75) Inventor: Thomas M Ingraham, Fort Collins, CO (US)

(73) Assignee: Advanced Manufacturing Technology, Loveland, CO (US)

( * ) Notice: Subject to any disclaimer, the term of this patent is extended or adjusted under 35 U.S.C. 154(b) by 7 days.

(21) Appl. No.: 11/050,278

(22) Filed: Feb. 3, 2005

(65) Prior Publication Data

US 2006/0180430 A1     Aug. 17, 2006

(51) Int. Cl.
*B65G 15/00*    (2006.01)
(52) U.S. Cl. ............... 198/836.3; 198/370.02; 198/466.1; 198/817; 198/836.1
(58) Field of Classification Search ........... 198/370.02, 198/817, 836.1, 836.3, 466.1
See application file for complete search history.

(56) References Cited

U.S. PATENT DOCUMENTS

| | | | | |
|---|---|---|---|---|
| 3,612,297 A | * | 10/1971 | Lapostolet | ................. 414/591 |
| 3,687,059 A | * | 8/1972 | Plattner et al. | ................. 100/4 |
| 4,264,002 A | * | 4/1981 | Van Der Schie | ......... 198/369.4 |
| 5,074,608 A | * | 12/1991 | Gabriel | ..................... 294/82.32 |
| 5,566,816 A | * | 10/1996 | Gross et al. | ................. 198/817 |
| 5,699,896 A | * | 12/1997 | Spada et al. | ................. 198/747 |
| 6,196,788 B1 | | 3/2001 | Talbot et al. | |
| 6,589,008 B1 | | 7/2003 | Ingraham | |

FOREIGN PATENT DOCUMENTS

EP             469570 A1 *    2/1992

* cited by examiner

*Primary Examiner*—Gene O. Crawford
*Assistant Examiner*—Leslie A. Nicholson, III
(74) *Attorney, Agent, or Firm*—Harness, Dickey & Pierce, P.L.C.

(57) ABSTRACT

The present invention is directed to an adjustable guide for a container conveyor system. The guide includes multiple pairs of pivoting mechanisms located along the conveyor. Each pivoting mechanism includes a first pivot arm and a second pivot arm which can be independently manipulated to locate a guide within a container envelope. The multiple pairs of pivoting mechanisms are operable coupled by a set of drive cables to permit simultaneous adjustment of the pivoting mechanisms.

16 Claims, 7 Drawing Sheets

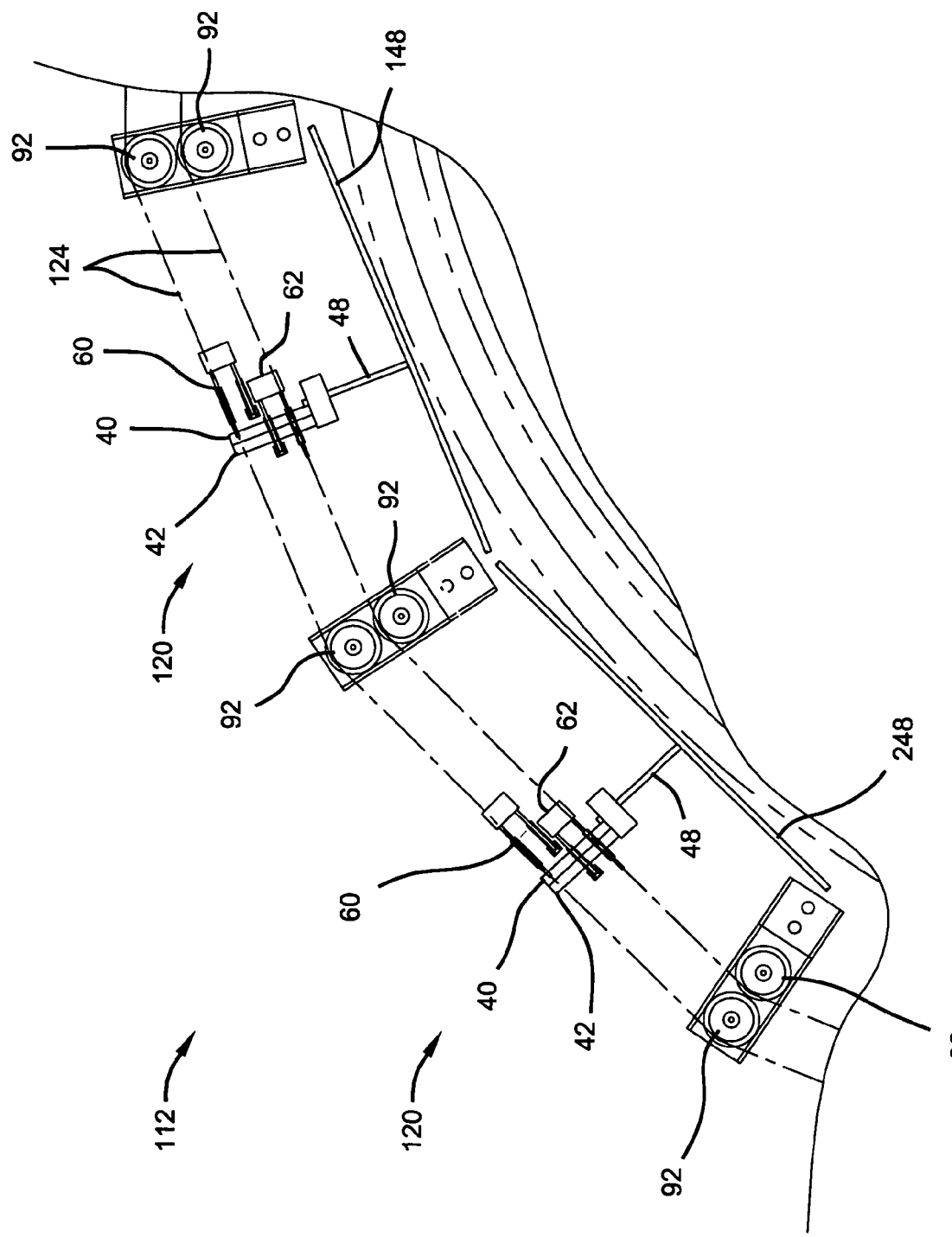

ADJUSTABLE GUIDE FOR A BOTTLE HANDLING SYSTEM

FIELD OF THE INVENTION

The present invention relates to a container handling system, and more particularly to a bottle handling system which includes an adjustable guide system along a conveyor.

BACKGROUND OF THE INVENTION

Currently, various packaging and shipping methods are used to transport containers, such as bottles, from one location to another. As such, it is often necessary to provide a bottle conveyor to transfer bottles from one machine to another in the handling process. Such conveyor systems will often utilize a guide rail assembly to maintain the proper orientation of the bottle as it is transferred along the conveyor. One such conveyor system is an air conveyance system which requires relatively accurate side rail positions to ensure efficient and accurate movement of the bottles along the length of the conveyor. Thus, guide rail assemblies of this type are typically constructed as a fixed element relative to the conveyor structure and having a means for making minor adjustments to the rail position.

One conventional method for supporting and positioning such guides along the conveyor involves the use of air cylinders. A plurality of air cylinders are coupled along the conveyor to provide guides for the body of the containers. Adjustments to the guides are made by actuation of the air cylinders. Such systems require extensive plumbing of air line to individually adjust end guide location. This conventional method is designed for specific bottles. When the bottles to be produced are changed the entire system must be reworked. If desired, the cost for such a change can approach the initial cost of the conveyor system.

In recent years, however, variations in shapes and sizes of containers have proliferated. Accordingly, it is desirable to have a system which allows guide rails along a conveyor to be continuously adjusted so that an initial system may accommodate any bottles in the future.

SUMMARY OF THE INVENTION

The present invention positions guides along a conveyor for a container packaging system. As such, the present invention provides the following advantages: substantially simultaneous adjustment of a plurality of guide rails, thereby providing rapid repositioning; adjustable along a nonlinear conveyor path; readily adaptable to be retrofitted to existing conveyor systems; provides for independent 2-axis adjustment for bottle height and width; utilization of a single drive mechanism for adjustment of guide rails along an extended length of conveyor; and flexibility for the location of the drive mechanism relative to the conveyor system (i.e. upstream or downstream location).

A pivoting structure for positioning a guide along a conveyor for a container packaging system according to the principles of the present invention includes a pivot base. A first pivoting member is rotatably connected to the pivot base, and a second pivoting member is rotatably connected to the first pivoting member. A guide is disposed on an end of the second pivoting member. A first connecting element is coupled to the first pivoting member and operable to rotate said first pivoting member through a first range of motion. A second connecting element is coupled to the second pivoting member and operable to rotate said second pivoting member through a second range of motion independent of the first range of motion. The second connecting element is arranged at a location to avoid unwanted torque on the first pivoting member. Movement through the first range of motion and the second range of motion locates the guide within a container shape envelope.

In another aspect of the present invention, a conveyor system having adjustable guides includes a system base and a conveyor for a container packaging system. A plurality of pivoting structures are coupled along the conveyor, and an actuation system is coupled to the pivoting structures. The pivoting structures are coupled along opposing sides of the conveyor. Multiple guides along a common side of the conveyor are intercoupled to form guide assemblies. The pivoting structures are operable by the actuation system to locate each of the guide assemblies to corresponding positions within a container shape envelope.

In another aspect of the present invention, a method of positioning guides along a conveyor for a container packaging system is disclosed. The method includes: (1) manipulating a drive element to substantially simultaneously operate a plurality of pivoting structures to locate a guide assembly associated therewith in a container shape envelope and (2) fixing the drive element with respect to a conveyor to locate guides of the pivoting structures to corresponding positions within the container shape envelopes.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5A is a top view of a conveyor with a nonlinear path according to the principles of the present invention.

DETAILED DESCRIPTION OF THE PREFERRED EMBODIMENTS

The following description of the preferred embodiments is merely exemplary in nature and is in no way intended to limit the invention, its application, or uses.

Figure 1:
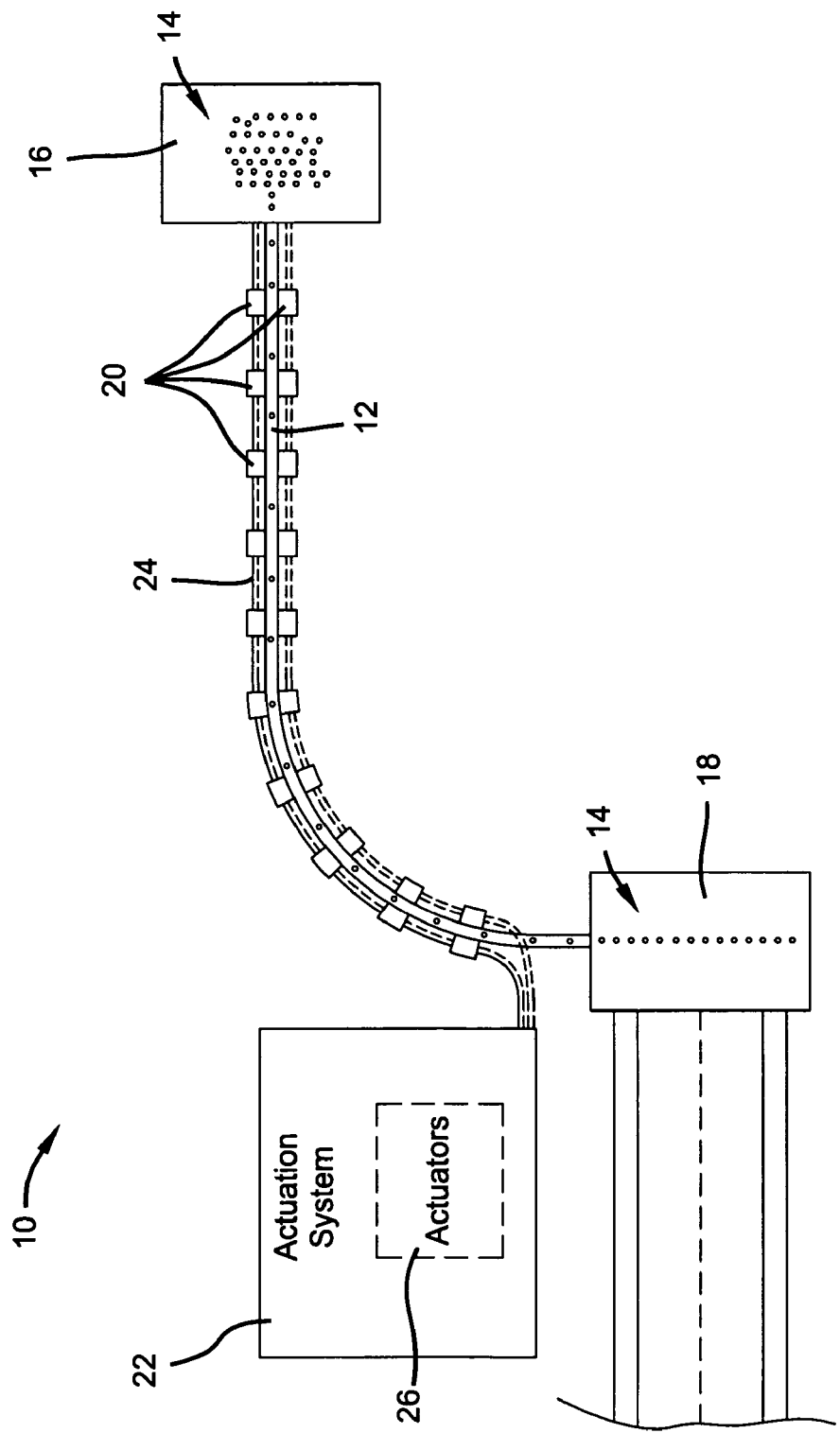
FIG. 1 is a top view of a conveyor system according to the principles of the present invention.

Referring now to FIG. 1, a conveyor system 10 for a container packaging system is shown. Conveyor system 10 includes conveyor 12 along which containers 14 are transported from infeed machine 16 to discharge machine 18. Infeed machine 16 collects a plurality of containers 14 and introduces them to the conveyor system 10 which accumulates and transports containers to discharge machine 18. Conveyor system 10 also includes a plurality of pivoting structures 20 coupled along conveyor 12. Pivoting structures 20 are operable to locate guides along conveyor 12 as is described in more detail below.

Additionally, conveyor system 10 includes an actuation system 22 operably coupled to the pivoting structures 20. Actuation system 22 includes drive elements 24 coupled to a plurality of pivoting structures 20 for operating the pivoting structures substantially simultaneously as described in more detail below. Actuation system 22 may also include one or more actuators 26. Each actuator 26 powers a drive element 24 to operate a plurality of pivoting structures 20 for locating the guides in a container shape envelope as is described in more detail below.

Figure 2:
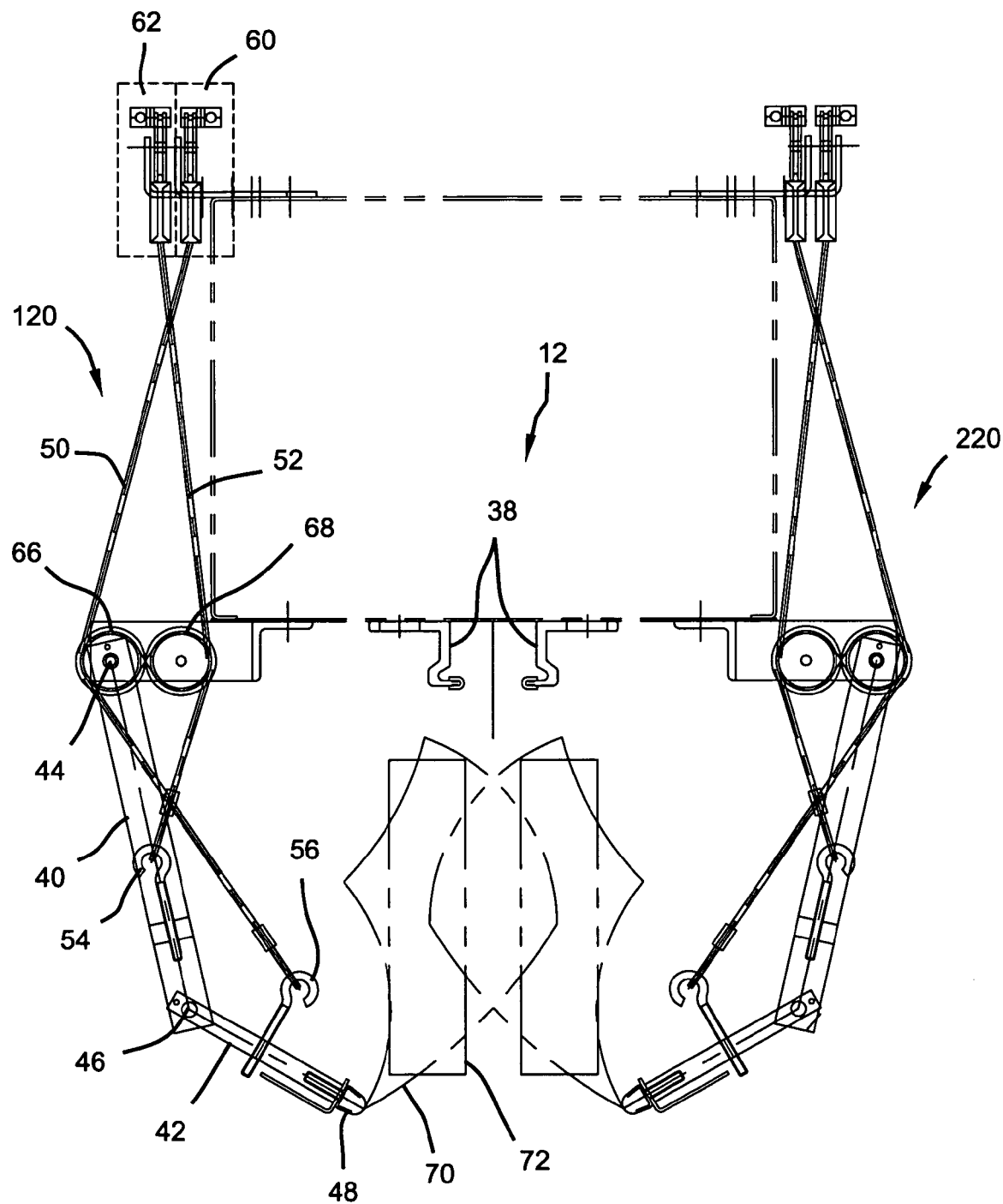
FIG. 2 is a front elevation of a pair of pivoting structures according to the principles of the present invention.

Referring now to FIG. 2, each pivoting structure 20 includes a pair of pivoting mechanisms 120, 220. Pivoting mechanisms 120, 200 are each coupled along conveyor 12. Conveyor 12 is a part of a container packaging system and includes neck guide 38. Neck guide 38 supports the containers traveling along conveyor 12 and, in combination with the guides 48 of pivoting mechanisms 120, 220, routes the containers being transported along conveyor 12. As pivoting mechanisms 120, 220 are substantially similar, only pivoting mechanism 120 will be described in detail herein. It is to be understood that the description of pivoting mechanism 120 and its components equally applies to pivoting mechanism 220 and its corresponding components.

Pivoting mechanism 120 includes pivoting members 40 and 42. First pivoting member 40 is rotatably connected to conveyor 12 at pivot 44 and is operable to rotate through a first range of motion. Second pivoting member 42 is rotatably connected to first pivoting member 40 at pivot 46 and is operable to rotate through a second range of motion independent of the first range of motion of first pivoting member 40. Pivoting mechanism 120 also includes guide 48. Guide 48 is disposed on an end of second pivoting member 42. According to the principles of the present invention, guide 48 interacts with containers being transported along conveyor 12. As pivoting mechanism 120 includes two pivoting members 40 and 42 with independent ranges of motion, guide 48 is able to be located in at least a two-dimensional area as described in more detail below.

Additionally, pivoting mechanism 120 includes two connecting elements 50 and 52. As shown in FIG. 2, connecting elements 50 and 52 are coupled to pivoting members 40 and 42 with eyebolts 54 and 56. Connecting elements 50 and 52 are coupled to drive elements 60 and 62. As presently preferred, connecting elements 50 and 52 are made of flexible cabling supported along conveyor 12 by pulley structures 66, 68, 166, and 168. Pulley structures 66 and 68 are shown in FIG. 2, and pulley structures 166 and 168 are shown in FIG. 4A. Connecting element 50 follows a path underneath pulley structure 66 and over pulley structure 68 to couple to pivoting member 40 at point 54. Connecting element 52 follows a path underneath pulley structure 168 and over pulley structure 166 to couple to pivoting member 42 at point 56. Such paths orient connecting elements 50 and 52 in positions to operate pivoting members 40 and 42.

Referring again to FIG. 2, connecting elements 50 and 52 are operably coupled to pivoting members 40 and 42, respectively, to be able to operate the pivoting members through the independent ranges of motion described above. The combination of these ranges of motion with respect to guide 48 is shown in FIG. 2 as travel envelope 70. Travel envelope 70 shows that guide 48 can be located in a two-dimensional area. FIG. 2 also shows container shape envelope 72. Container shape envelope 72 represents an area of desired locations of guide 48 corresponding to various sizes and shapes of containers to be transported along conveyor 12. Thus, travel envelope 70 substantially overlaps container shape envelope such that pivoting mechanisms 120, 220 can be used to locate the guides 48 in a wide range of positions to accommodate different containers.

Figure 3A:
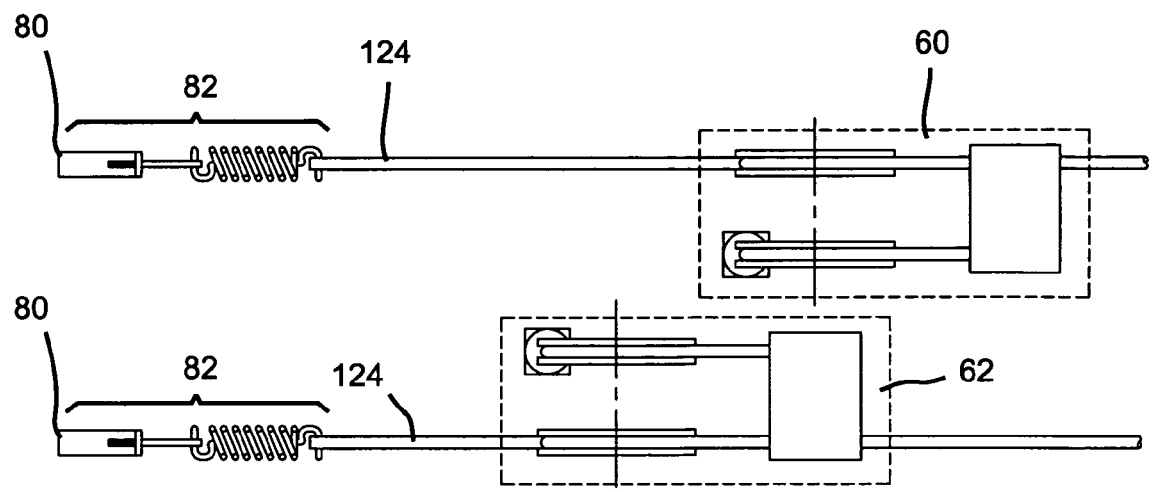
FIGS. 3A and 3B are top views of drive elements and related components according to the principles of the present invention.
Figure 3B:
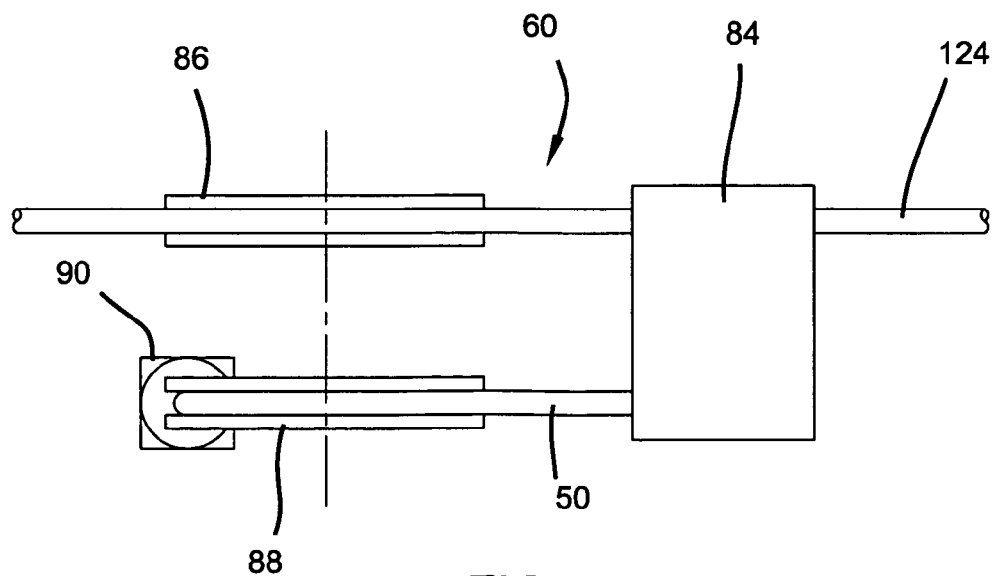

In FIGS. 3A and 3B, top views of drive elements 60, 62 and related components are shown. Referring to FIG. 3A, drive elements 60, 62 are shown and include a drive cable 124. With reference to FIGS. 3 and 4, it is to be understood that the description of drive element 60 and its related components equally applies to drive element 62 and its corresponding related components. Drive cable 124 is coupled to base 80 via a spring assembly 82. Spring assembly 82 is coupled between drive cable 124 and base 80 to maintain drive cable 124 in tension. Tension is needed in drive cable 124 in order to operate a plurality of pivoting structures substantially simultaneously as described in more detail below, as well as to minimize sag of the drive cable 124.

Referring now to FIG. 3B, an enlarged view is shown of drive element 60 which couples drive cable 124 to pivoting mechanism 120 via connection elements 50. Drive cable 124 is coupled to connecting element 50 by clamping element 84. Clamping element 84 enables forces to be transmitted from drive cable 124 to connecting element 50. Multiple clamping elements 84 coupled along drive cable 124 allow drive cable 124 to operate a plurality of pivoting structures substantially simultaneously as is described in more detail below. Pulley structures 86 and 88 maintain the alignment and position of drive cable 124 and connecting element 50, respectively. A cable guide 90 is also included and is described in further detail below with reference to FIG. 4B.

Figure 4C:
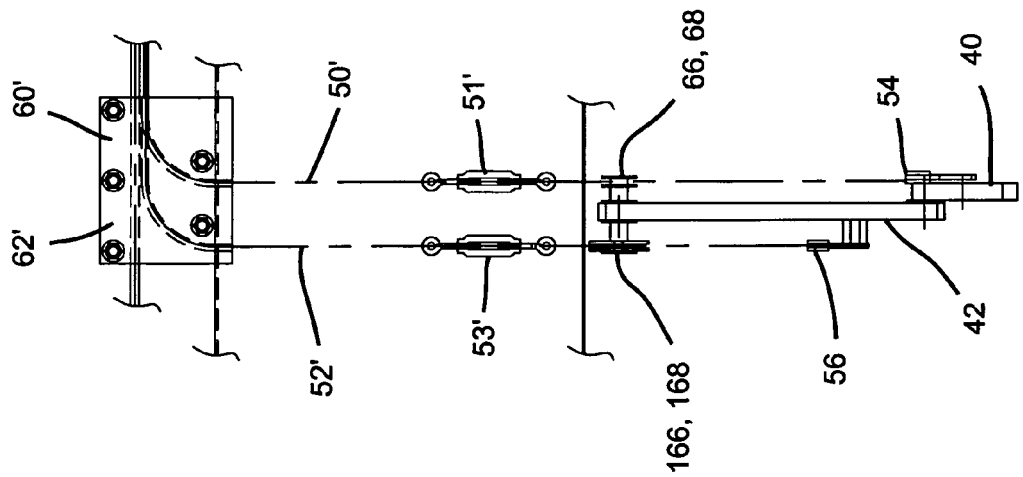
FIG. 4C is a side elevation of an alternate arrangement of the connecting elements and related components according to the principles of the present invention.
Figure 4A:
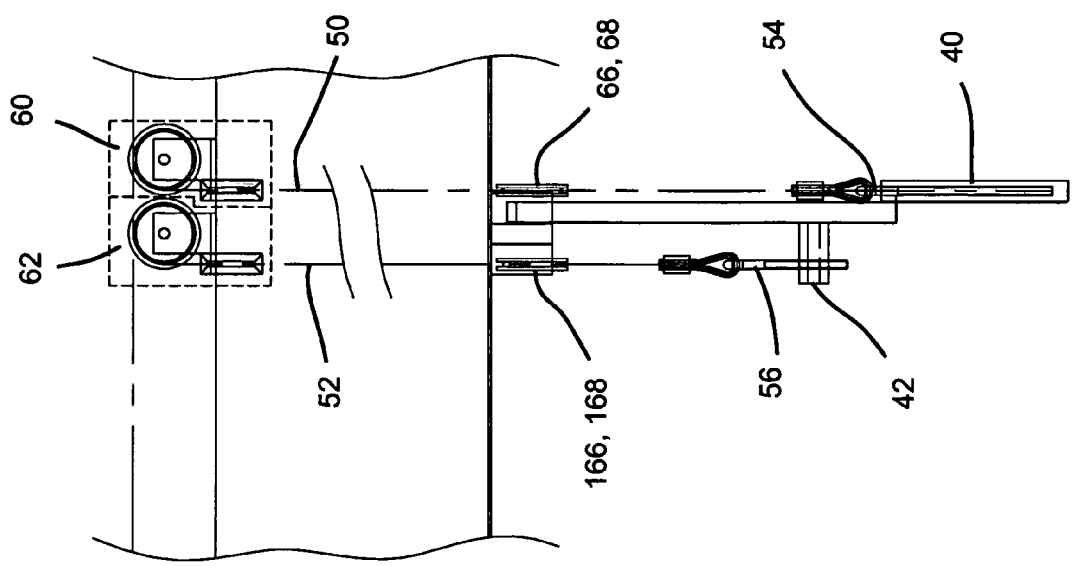
FIGS. 4A and 4B are side elevations of connecting elements and related components according to the principles of the present invention.
Figure 4B:
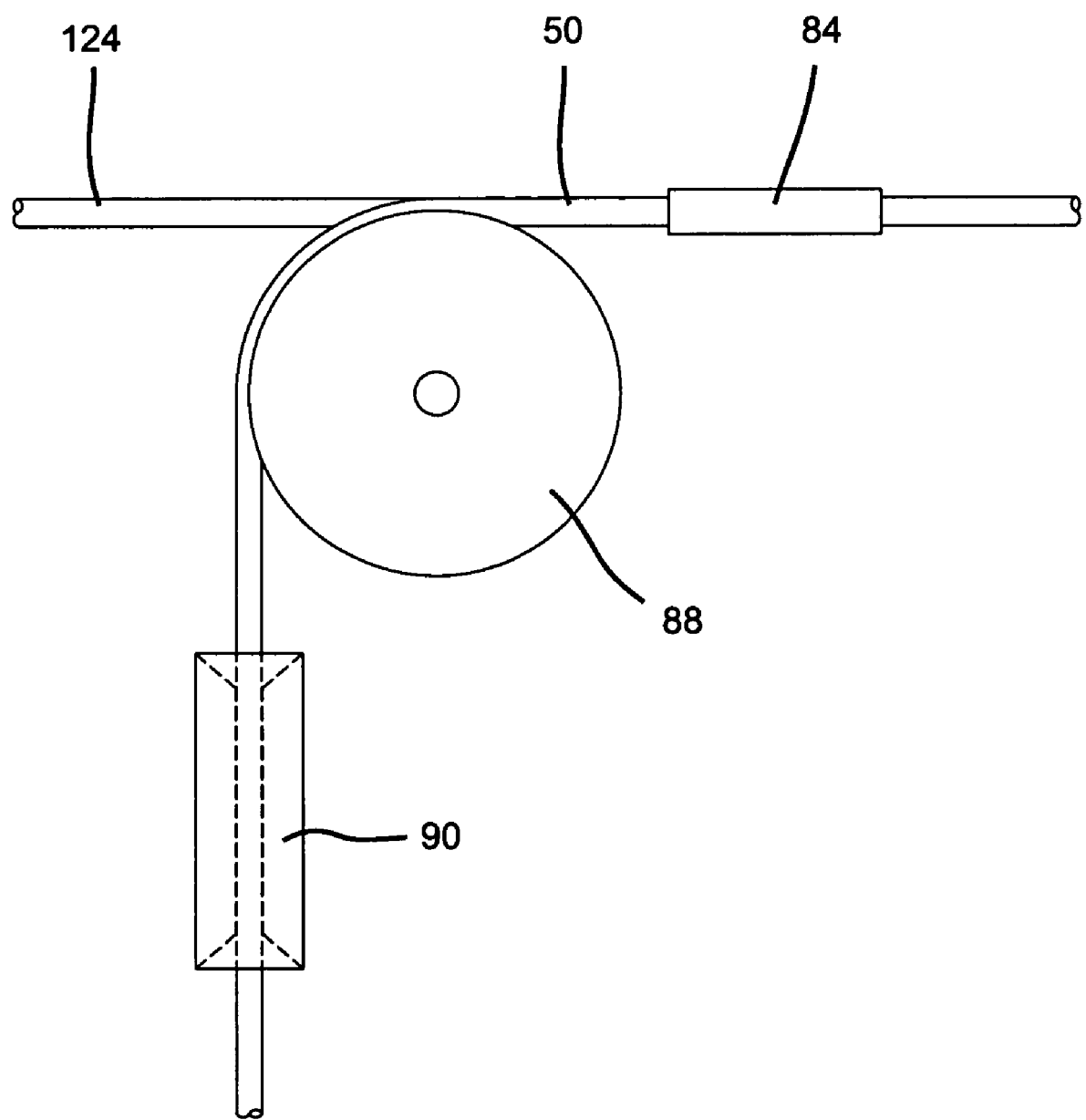

Referring now to FIGS. 4A and 4B, connecting elements 50 and 52 are connected to drive elements 60 and 62; pulley structures 66, 68, 166, and 168; and pivoting members 40 and 42. With specific reference to FIG. 4B, an enlarged side view is shown of drive cable 124 coupled to drive element 60 as depicted in FIGS. 2, 3A, 3B, and 4A. Drive cable 124 and connecting element 50 are coupled by clamping element 84. Drive cable 124 is aligned and positioned by pulley structure 86 (shown in FIG. 3B) and connecting element 50 is aligned and positioned by pulley structure 88. Connecting element 50 travels through cable guide 90 which functions to align connecting element 50 to engage pulley structure 88.

Referring now to FIG. 4C an alternate arrangement of the drive elements 60' and 62' is shown in which machined blocks are used in place of pulleys for directing the connecting elements 50' and 52' from drive cable 124 to pulley structures 66, 68, 166, and 168 for operating pivoting members 40 and 42. In this regard, drive elements include blocks 60' and 62' which have a machined radius formed therein to provide a guide surface over which the connecting elements 50' and 52' can slide. This configuration combines enables the functions provided be the pulleys and the guide elements illustrated in FIGS. 4A and 4B to be combined in to a single component. An adjustment elements 51' and 53' in the form of a turnbuckle or the like may be incorporated into the connecting elements 50' and 52' to provide a degree of adjustment for the lengths thereof.

Figure 5B:
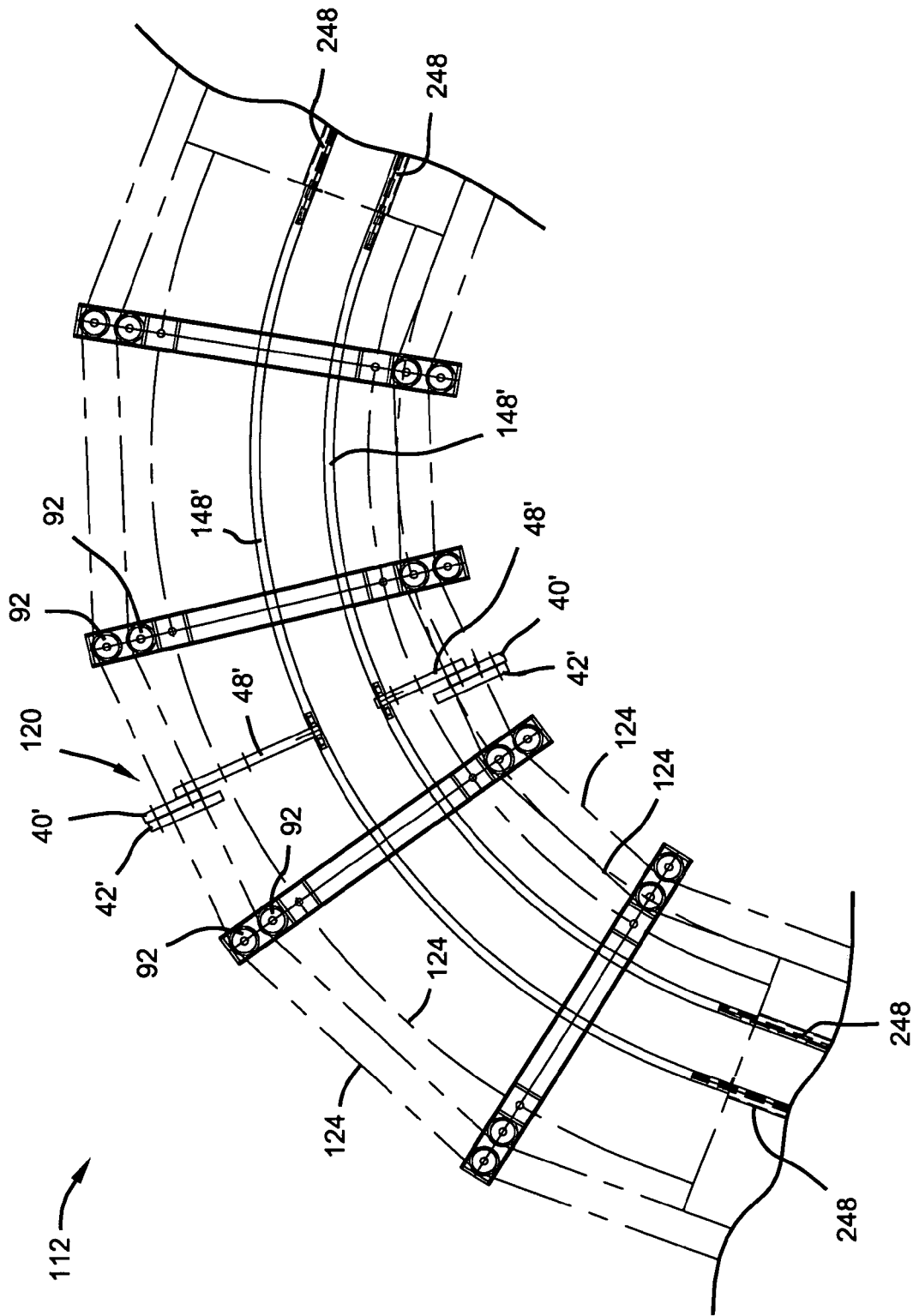
FIG. 5B is a top view of an alternate arrangement of the conveyor with a nonlinear path according to the principles of the present invention.

By using flexible drive cable, the present invention is readily adaptable for use along a tortuous conveyor path which may rise or fall in elevation as well as turn in various directions. Referring now to FIGS. 5A and 5B, conveyor 112, which has a nonlinear path, is shown. Pivoting mechanisms 120 are coupled along opposing sides of conveyor 112. According to the principles of the present invention, pivoting structures 120 are operable to locate guides 148, 148' disposed on ends of pivoting mechanisms 120 along conveyor 112. Guides 148, 148' can be coupled with other guides such as a guide bars 248, 248' along the same side of conveyor 112 to form a guide assembly or alternately may separate but move in a coordinated manner with respect to guide bars 248, 248'. Drive cables 124 are coupled to pivoting mechanisms 120 and transmit power to operate pivoting mechanisms 120 substantially simultaneously. Pulley structures 92 engage with and route drive cables 124 along the nonlinear path of conveyor 112.

The operation of the present invention is substantially consistent in a variety of configurations and along a variety of paths. First, actuators 26 are coupled to drive cables 124 and pull the drive cable 124 against the bias of spring 82 to operate a plurality of pivoting mechanisms 20 substantially simultaneously. Drive cables 124 move axially, and that movement is translated to connecting elements 50 and 52 through clamping members 84. The movement of connecting elements 50 and 52 causes pivoting members 40 and 42 to rotate and guides 48 to change location. In this manner, drive element 60 is used to position pivot member 40 and drive element 62 is used to position pivot member 42.

When the combination of movement has positioned guides 48 at the desired locations within container shape envelopes 72, actuation system 22 then fixes drive cable 124. As drive cables 124 are in tension, the positions of all the components are maintained. When a container 14 with a different shape needs to be accommodated, the locations of guides 48 may be changed accordingly.

A preferred configuration of the present invention would include one pivoting structure 20 on each side of conveyor 12 for every five feet of conveyor 12. Additionally, a preferred configuration would include a multiple of actuators 26, the number depending on the number of drive cables 124 in the system. As presently preferred, a single actuator 26 can be used to position one hundred feet of drive cable 124 in each direction. Thus, in such a configuration, one drive element 24 and one actuator 26 could operate up to forty pivoting structures 20. Actuators 26 are included which can provide a desired accuracy corresponding to the size of container shape envelopes 72. Suitable actuators 26 may include fluidic muscles, pneumatic motors, hydraulic and pneumatic cylinders stepper motors, servo motors, stepped air cylinders, and servo air cylinders, but it is anticipated that others may be used.

The components of the present invention can be made of a variety of materials. In a typical embodiment of the present invention, the drive elements and the connecting elements are flexible drive elements. As such, suitable materials for both include wire rope and steel cables. It is anticipated that other materials can be used for both of these elements. Pivoting members 40 and 42, clamping members 84, pulley structures 66, 68, 86, 88, and 92, and directing structures 90 that are included in the present invention are preferably substantially rigid and can be made of a variety of suitable materials in accordance with the given application. Guides 48 can be shaped to correspond to the path of conveyor 12 and must be rigid enough to maintain shape while interacting with containers 14 traveling along the conveyor 12.

According to the principles of the present invention, conveyor 12 can have paths of various shapes, and containers 14 can have a variety of shapes and sizes. It is anticipated that pivoting structures 20 can be located in various configurations along conveyor 12. It is also anticipated that connecting elements 50 and 52 may be coupled to pivoting members 40 and 42 in a variety of ways. It is to be understood that pivoting mechanisms 120, 220 can be configured to operate according to the principles of the present invention independent of pulley structures 66, 68, 166, and 168. Additionally, travel envelope 70 is variable with respect to the size and configuration of the components of pivoting structure 120, and container shape envelope 72 varies with the applications of the container packaging system.

Additionally, pulley structure 86 is shown as an exemplary way to provide support for drive cable 124. It is to be understood that a variety of structures could support drive cable 124, including pulleys, semi-circular channels and tubes as dictated by the given application. The use of pulley structures or semi-circular channels would allow for less complicated assembly than the use of tubes. Pulley structures also would help prevent water build up in the system. Additionally, a tube could help prevent unwanted motion of a drive element which may cause the drive cable to jump off line.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A pivoting structure for positioning a guide along a conveyor for a container packaging system comprising:
    a pivot base;
    an articulating assembly having a first member rotatably connected to said base and a second member rotatably connected to said first member opposite said base;
    a guide disposed on an end of said second member of said articulating assembly opposite said first member;
    a first connecting element coupled to said articulating assembly at said first member and operable to rotate said first member through a first range of motion;
    a second connecting element coupled to said articulating assembly at said second member and operable to rotate said second member through a second range of motion independent of said first range of motion, said first and second connecting elements being flexible cables; and
    a first pair of pulley structures interacting with said first and second connecting elements to position said first and second connecting elements to operate said first and second members of said articulating assembly,
    wherein movement of said first and second members of said articulating assembly within said first and second ranges of motion locates said guide within a container shape envelope defined proximate the conveyor of the container packaging system.

2. The pivoting structure of claim 1, further comprising an actuation system including at least one drive element and at least one actuator, wherein said actuation system is operably coupled to said first ad second connecting elements to rotate said first and second members of said articulating assembly through said first and second ranges of motion.

3. The pivoting structure of claim 2 further comprising at least one spring assembly coupled to said at least one drive element for maintaining said drive element in tension.

4. The pivoting structure of claim 2 wherein said actuation system includes a first drive element for coupling said actuation system to said first connecting element and a second drive element for coupling said actuation system to said second connecting element.

5. The pivoting structure of claim 4 wherein said drive elements are drive cables.

6. The pivoting structure of claim 4 further comprising a second pair of pulley structures, wherein said second pair of pulley structures engage and align said first drive element and said first connecting element.

7. The pivoting structure of claim 6 further comprising an element guide routing said first connecting element to engage with one of said second pair of pulley structure.

8. The pivoting structure of claim 4 further comprising a clamping member for coupling said first drive element and said first connecting element to transmit a force therebetween.

9. The pivoting structure of claim 1 wherein said container shape envelope defines a two dimensional area oriented perpendicular to a direction extending along the conveyor of the container packaging system.

10. A pivoting structure system comprising a plurality of pivoting structures coupled to a base in paired sets along opposing sides of said base in a spaced relation, each of said plurality of pivoting structures including:
  a first pivoting member rotatably connected to said base;
  a second pivoting member rotatably connected to said first pivoting member;
  a guide disposed on an end of said second pivoting member;
  a first cable coupled to said first pivoting member;
  a second cable coupled to said second pivoting member; and
  an actuation system coupled to said plurality of pivoting structures and said base including at least one drive cable and at least one actuator for positioning said guide within a container shape envelope,
  wherein said actuation system comprises:
    a first drive cable for coupling said actuation system to said first cable;
    and a second drive cable for coupling said actuation system to said second cable;
    wherein each said drive cables operates said corresponding connecting elements substantially simultaneously.

11. The pivoting structure system of claim 10 wherein said actuation system further comprises a first actuator coupled to said first drive cable and a second actuator coupled to said second drive cable, wherein said actuators operate said pivoting structures to locate said guide assemblies to corresponding positions within said container shape envelope.

12. The pivoting structure system of claim 10 wherein said first and second drive cables couple said actuation system to said first and second cables on a first side of said base, and wherein said actuation system further comprises:
  a third drive cable for coupling said actuation system to said first cable on an opposing side of said base; and
  a fourth drive cable for coupling said actuation system to said second cable on said opposing side of said base;
  wherein each said drive cables operates each cable substantially simultaneously.

13. The pivoting structure system of claim 12 wherein said actuation system further comprises a first actuator coupled to said first drive cable, a second actuator coupled to said second drive cable, a third actuator coupled to said third drive cable, and a fourth actuator coupled to said fourth drive cable, wherein said actuators operate said pivoting structures to locate said guide assemblies to corresponding positions within said container shape envelope.

14. A pivoting structure system comprising a plurality of pivoting structures coupled to a base in paired sets along opposing sides of said base in a spaced relation and an actuation system coupled to said plurality of pivoting structures and said base, each of said plurality of pivoting structures including:
  an articulating assembly having a first member rotatably connected to said base and a second member rotatably connected to said first member opposite said base;
  a guide disposed on an end of said second member of said articulating assembly opposite said first member;
  a first cable coupled to said articulating assembly at said first member;
  a second cable coupled to said articulating assembly at said second member; and
  a pair of pulley structures interacting with said first and second cables to position said first and second cables to operate said first and second members of said articulating assembly;
  wherein said actuation system includes at least one drive cable and at least one actuator for positioning said guides within a container shape envelope.

15. The pivoting structure system of claim 14 further comprising at least one pulley structure for supporting and aligning said drive cable along said base, wherein said pulley structure allows said drive cable to extend continuously along said base.

16. The pivoting structure system of claim 14 wherein said container shape envelope defines a two dimensional area oriented perpendicular to a direction extending along said opposing sides of said base.

* * * * *